(12) United States Patent
Vitet

(10) Patent No.: US 9,254,818 B2
(45) Date of Patent: Feb. 9, 2016

(54) SEAT BELT RETRACTOR FOR A MOTOR VEHICLE

(71) Applicant: GM GLOBAL TECHNOLOGY OPERATIONS LLC, Detroit, MI (US)

(72) Inventor: Stephane Vitet, Frankfurt am Main (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 207 days.

(21) Appl. No.: 14/010,654

(22) Filed: Aug. 27, 2013

(65) Prior Publication Data

US 2014/0061353 A1    Mar. 6, 2014

(30) Foreign Application Priority Data

Aug. 29, 2012   (DE) .......................... 10 2012 017 093

(51) Int. Cl.
*B60R 22/46*   (2006.01)
*B60R 22/28*   (2006.01)

(52) U.S. Cl.
CPC ....... *B60R 22/4676* (2013.01); *B60R 2022/288* (2013.01)

(58) Field of Classification Search
USPC ........ 242/376, 376.1, 379, 379.1, 384, 384.2, 242/384.4
See application file for complete search history.

(56) References Cited

U.S. PATENT DOCUMENTS

| | | | |
|---|---|---|---|
| 4,763,853 A * | 8/1988 | Andersson .............. | B60R 22/41 242/383.1 |
| 5,794,877 A | 8/1998 | Ono et al. | |
| 6,290,159 B1 * | 9/2001 | Specht et al. .............. | 242/379.1 |
| 7,992,817 B2 | 8/2011 | Holbein et al. | |
| 2005/0098672 A1 | 5/2005 | Tanaka et al. | |

FOREIGN PATENT DOCUMENTS

DE        10260400 A1    7/2004
DE    102010048583 A1    5/2011

* cited by examiner

*Primary Examiner* — Emmanuel M Marcelo
*Assistant Examiner* — Angela Caligiuri
(74) *Attorney, Agent, or Firm* — Ingrassia Fisher & Lorenz PC

(57) ABSTRACT

A seat belt retractor is provided for a motor vehicle with a receiving part for a seat belt retractable on the receiving part, a deceleration sensor for detecting a deceleration in the seat belt retractor, a first extension speed sensor for detecting an extension speed of the seat belt prior to activating an energy absorption device. The energy absorption device fixes the seat belt during an accident with energy absorption, so that when a first deceleration limit detected by the deceleration sensor is exceeded the seat belt is restrained with energy absorption. The seat belt retractor encompasses a locking mechanism for securing the seat belt and a second extension speed sensor for detecting an extension speed after activating the energy absorption device. When a second extension speed limit of the seat belt has been exceeded, the locking mechanism restrains the seat belt without energy absorption.

13 Claims, 5 Drawing Sheets

SEAT BELT RETRACTOR FOR A MOTOR VEHICLE

CROSS-REFERENCE TO RELATED APPLICATION

This application claims priority to German Patent Application No. 10 2012 017 093.9, filed Aug. 29, 2012, which is incorporated herein by reference in its entirety.

TECHNICAL FIELD

The technical field relates to a seat belt retractor, a method for operating a seat belt retractor, and a motor vehicle.

BACKGROUND

Motor vehicles with an internal combustion and/or electric engine exhibit a motor vehicle interior for accommodating individuals. Front and rear seats are here situated in the motor vehicle interior accommodating the individuals. The front seats are generally designed as a driver and passenger seat, and the rear seats are often designed as a rear seat bench with several rear seats. The motor vehicle generally exhibits an airbag for each of the two individuals on the front seats. Further situated in the motor vehicle is a seat belt retractor for the driver's seat and passenger seat, i.e., two seat belt retractors each for the driver's and passenger seat as front seats.

A deceleration sensor, for example an electronic deceleration sensor or mechanical deceleration sensor with a pendant control unit, detects a deceleration or negative acceleration of the motor vehicle or seat belt retractor, and once a prescribed limit for the deceleration has been exceeded, an energy absorption device is activated with a torsion rod. With the energy absorption device activated, energy absorption restrains the seat belt from being pulled out, meaning that the torsion rod deforms or twists when a high enough tensile force acts on the seat belt, so that lower restraining forces are exerted on the individual in the front seat by the seat belt in the event of an accident.

The energy absorption device makes it possible to pull the seat belt out of the seat belt retractor with a large force after activating the energy absorption device, so that while the individual on the front seat might move toward a steering wheel or dashboard and even come into contact with the latter, the activated airbag prevents this from happening, so that even though the seat belt is pulled out of the seat belt retractor through energy absorption, there is no danger that the individual on the front seat will directly contact the steering wheel or dashboard, since the airbag prevents this contact.

The individuals on the rear seats are also secured by seat belts, and the motor vehicle exhibits seat belt retractors for individuals on the rear seats for this purpose. Such seat belt retractors for a seat belt for an individual on the rear seat do not exhibit any energy absorption devices, but rather only a locking mechanism for securing the seat belt without energy absorption, meaning that once the locking mechanism has been activated, the seat belt can no longer be pulled out of the seat belt retractor, even when greater forces are acting on the seat belt. This is necessary to prevent individuals on the rear seats from contacting the front seats during an accident. Because the locking mechanism restrains the seat belt without energy absorption, the seat belt exerts very high restraining forces on the individuals during an accident, so that there is here a danger that individuals on the rear seats will be injured due to the highly active restraining forces.

Known from DE 10 2010 048 583 A1 is a seat belt system. A short circuit part is provided that short circuits the power supply clamps of the motor that retracts the seat belt, and the short circuiting of the power supply clamps prevents the seat belt retracted by the motor from being pulled out. DE 60 2004 003 663 T2 shows a seat belt retractor encompassing a receiving part for retracting a seat belt, a motor for generating a drive torque, so as to rotate the receiving part, and a force transmission mechanism for transmitting the drive torque of the motor to the receiving part. The force transmission mechanism is provided with a hypocycloid wheel mechanism that reduces the motor speed while transmitting the rotation of the motor to the receiving part.

Therefore, at least one object is to provide a seat belt retractor, a method for operating a seat belt retractor, and a motor vehicle in which individuals on the rear seats of the motor vehicle essentially make no contact with the front seats during an accident, despite which comparatively low restraining forces are exerted by the seat belt on the individuals on the rear seats during the accident. In addition, other objects, desirable features and characteristics will become apparent from the subsequent summary and detailed description, and the appended claims, taken in conjunction with the accompanying drawings and this background.

SUMMARY

A seat belt retractor is provided for a motor vehicle, in particular for a rear seat of the motor vehicle, encompassing a receiving part for a seat belt, a seat belt retracted or retractable on the receiving part, a deceleration sensor for detecting a deceleration in the seat belt retractor or motor vehicle and/or a first extension speed sensor for detecting an extension speed of the seat belt prior to activating an energy absorption device, the energy absorption device for fixing the seat belt during an accident with energy absorption, which is functionally connected with the deceleration sensor and/or the first extension speed sensor, so that when a first deceleration limit detected by the deceleration sensor is exceeded and/or when a first extension speed limit detected by the first extension speed sensor is exceeded during an accident, the seat belt is restrained with energy absorption.

The seat belt retractor encompasses a locking mechanism for securing the seat belt without energy absorption and a second extension speed sensor for detecting an extension speed of the seat belt after activating the energy absorption device, and the locking mechanism is functionally connected with the second extension speed sensor, so that when a second extension speed limit of the seat belt has been exceeded, in particular only when the energy absorption device is activated, the locking mechanism restrains the seat belt without energy absorption. When the seat belt is restrained without energy absorption, the seat belt can also not be pulled out of the seat belt retractor even when the seat belt is exposed to large tensile forces.

The seat belt retractor is designed especially for a rear seat of the motor vehicle. The seat belt retractor here exhibits a deceleration sensor and a first extension speed sensor for the seat belt. The deceleration sensor and/or first extension speed sensor is used to activate the energy absorption device, i.e., the seat belt is restrained with energy absorption with the energy absorption device activated, meaning that it can be unrolled slightly from the seat belt retractor when high tensile forces are acting on the seat belt, and thus pulled out. The deceleration sensor of the seat belt retractor can here be arranged on the seat belt retractor or also on some other location of the motor vehicle. For example, the deceleration sensor is here designed as a mechanical deceleration sensor with a pendant control unit or as an electronic deceleration sensor.

In addition, the seat belt retractor exhibits a second extension speed sensor, which detects the extension speed of the seat belt with the energy absorption device activated. In an accident, the energy absorption device is activated either by the deceleration sensor or the first extension speed sensor. This depends on whether the deceleration limit or first extension speed limit is exceeded first. After the energy absorption device is activated during an accident, the seat belt is pulled out of the seat belt retractor with energy absorption. Because the seat belt is pulled out of the seat belt retractor with energy absorption, there is a danger that an individual on the rear seat will come into contact with the front seat and thereby injure themselves given an arrangement of the seat belt retractor on or for a rear seat of the motor vehicle. For this reason, the second extension speed sensor is used to detect the extension speed of the seat belt after the energy absorption device has been activated, and the seat belt is restrained without energy absorption if a second extension speed limit is exceeded, which in the end also renders the energy absorption device ineffective, since the seat belt can no longer be restrained or pulled out with energy absorption.

The more serious the accident, the larger the individual on the rear seat and the heavier the individual on the rear seat, the higher the second extension speed of the seat belt during energy absorption. The second extension speed limit is here designed in such a way that the locking mechanism is only activated given especially serious accidents, particularly large individuals on the rear seats and/or especially heavy individuals on the rear seats. Only in the event of especially serious accidents, particularly large individuals and/or especially heavy individuals on the rear seats is there a danger that securing the seat belt with energy absorption might cause the individual to come into contact with the front seat during the accident.

In less serious or minor accidents and given particularly light individuals and/or especially small individuals on the rear seats, there is no need to restrain the seat belt without energy absorption, since, given the lack of accident severity, size of the individual and/or weight of the individual, there is already no danger that the individual will come into contact with the front seat as the result of securing the seat belt with energy absorption. As a consequence, the seat belt retractor for the motor vehicle can be used to optimize how individuals are restrained on the rear seats. In the event of serious accidents, heavy individuals on the rear seats and/or large individuals on the rear seats, the locking mechanism is activated, rendering the energy absorption device ineffective, so that there is no danger of individuals on the rear seats coming into contact with the front seats during an accident, since the individuals on the rear seats are restrained by the seat belt retractor, because the seat belt is restrained without energy absorption by the activated locking mechanism.

In the event of a less serious accident, lighter individuals on the rear seats and/or smaller individuals on the rear seats, the locking mechanism is not activated, so that individuals on the rear seats can be held on the rear seats with an especially low restraining force. The individuals on the rear seats still do not come into contact with the front seat during the accident.

In an additional embodiment, the locking mechanism is mechanically functionally connected with the receiving part, so that when the second extension speed limit of the seat belt is exceeded, the locking mechanism restrains the receiving part and/or the receiving part is a roll or spool. In a supplementary variant, the energy absorption device encompasses a torsion rod and a rod locking device, wherein the torsion rod is rigidly joined with the receiving part at a first location, and the torsion rod is functionally connected with the rod locking device at a second location, and the torsion rod is restrained by the rod locking device in the event of an accident if a deceleration limit detected by the deceleration sensor is exceeded and/or if a first extension speed limit detected by the first extension speed sensor is exceeded. The torsion rod is twisted with the energy absorption device activated, so that the seat belt can be prevented from exerting large restraining forces on the individual.

In another embodiment, the first and/or second extension speed sensor detects the angular speed of the receiving part as a characteristic variable of the extension speed of the seat belt. The receiving part is preferably mounted on a remaining seat belt retractor so that it can be turned around a rotational axis.

In an additional embodiment, the first extension speed sensor encompasses a first rotational element and a first resilient element, in particular a first spring, on the torsion rod or a part joined with the torsion rod, and the first resilient element is functionally connected with the first rotational element, and a centripetal acceleration stemming from a rotational motion of the torsion rod or the part joined with the torsion rod acts on the rotational element, so that the centripetal acceleration causes the first, correspondingly mounted rotational element to move in a first direction, and the first resilient element applies a force to the rotational element opposite the first direction during the rotational motion of the torsion rod or the part joined with the torsion rod. The first extension speed sensor is hence a mechanical extension speed sensor. For example, the first direction is aimed essentially radially to the outside relative or in relation to or on the rotating rotation disk.

In an additional embodiment, the second extension speed sensor encompasses a second rotational element and a second resilient element, in particular a second spring, on a rotational part and the second resilient element is functionally connected with the second rotational element, and a centripetal acceleration stemming from a rotational motion of the rotational part acts on the second rotational element, so that the centripetal acceleration causes the second, correspondingly mounted rotational element to move in a second direction, and the second resilient element applies a force to the second rotational element opposite to the second direction during the rotational motion of the rotational part, and the rotational part is mechanically functionally connected with the receiving part in such a way that the rotational part is joined with the receiving part only with the energy absorption device activated, in particular also performing the rotational motion of the receiving part. The second extension speed sensor is hence a mechanical second extension speed sensor.

In another additional embodiment, the area of the first rotational element accommodates a first restraining part with an internal toothed ring, and the first rotational element engages the internal toothed ring on the first restraining part at a limit for the movement position in the first direction of the first rotational element, so that the torsion rod is secured at the second location and/or the area of the second rotational element accommodates a second restraining part with an internal toothed ring, and the second rotational element engages the internal toothed ring on the second restraining part at a limit for the movement position in the second direction of the second rotational element, so that the rotational part and receiving part are secured.

In a supplementary variant, the first extension speed sensor is a generator, which is mechanically driven by the rotating receiving part, and the seat belt is secured with energy absorption as a function of the current produced by the generator, in particular the potential of the current, when a first current magnitude limit is exceeded, and/or the second extension speed sensor is a generator, which is mechanically driven by the rotating receiving part or rotational part, and the seat belt is secured by the locking mechanism without energy absorption as a function of the current produced by the generator, in particular the potential of the current, when a second current magnitude limit is exceeded only with the energy absorption device activated.

In an additional embodiment, the first and/or second extension speed sensor is an optical, magnetic or inductive extension speed sensor for detecting the angular speed of the receiving part and/or the rotational part and/or the speed of the seat belt. For example, an optical extension speed sensor detects an optical marking on the outside of the receiving part, and can thereby detect the angular speed of the receiving part.

In a supplementary variant, the locking mechanism encompasses an actuator, preferably an electrical, magnetic or pyrotechnic actuator, and the locking mechanism and/or the energy absorption device or a locking device can be activated with an actuator. For example, the first and second extension speed sensors are designed as an electric or electronic extension speed sensor, and the data acquired by the first and second extension speed sensors are detected by a control and/or regulator unit, and, as a function thereof, the actuator for the locking mechanism and actuator for the energy absorption device or locking device are activated with the control and/or regulator unit. To this end, corresponding data are stored in the control and/or regulator unit with a computer and data memory.

A method according to an embodiment for operating a seat belt retractor, in particular a seat belt refractor described in this patent application, for a rear seat of a motor vehicle with the following steps: A deceleration value for the motor vehicle and/or a first extension speed of the seat belt are acquired before an energy absorption device secures the pulling out of the seat belt with energy absorption and a second extension speed from the seat belt retractor is acquired after the energy absorption device has secured the pulling out of the seat belt with energy absorption, the seat belt is locked to prevent it from being pulled out with energy absorption if a deceleration value limit and/or a first limit for the first extension speed of the seat belt out of the seat belt retractor is exceeded, and the seat belt is locked to prevent it from being pulled out without energy absorption while the seat belt is being pulled out with energy absorption if the second limit for the extension speed of the seat belt out of the seat belt retractor is exceeded.

In an additional embodiment, the seat belt is first locked so that it cannot be pulled out with energy absorption, after which the seat belt is locked so that it cannot be pulled out without energy absorption. It is best that the seat belt be locked so that it cannot be pulled out without energy absorption with a locking mechanism, and the energy absorption device is activated by a locking device, in particular a rod locking device. The locking mechanism and locking device are preferably separate components, so that the locking mechanism and locking device can be activated and/or moved spatially separate from each other.

A motor vehicle according to an embodiment, encompassing at least one front seat with at least one seat belt retractor for a seat belt on the at least one front seat, at least one rear seat, which is or are located behind the at least one front seat, with at least one seat belt retractor for a seat belt on the at least one rear seat, wherein the at least one seat belt retractor for a seat belt on the at least one rear seat is designed as a seat belt retractor described in this patent application and/or the motor vehicle can be used to implement a method described in this patent application and/or the at least one seat belt retractor for the seat belt on the at least one rear seat encompasses an energy absorption device.

In a further embodiment, the seat belt exhibits a seat belt pretensioner. The deceleration sensor on the seat belt retractor and/or on the motor vehicle detects a deceleration or negative acceleration of the motor vehicle, and the seat belt pretensioner retracts the seat belt into the seat belt retractor if an acceleration limit is exceeded, i.e., rolls it up on the receiving part, after which the energy absorption device is activated. The activation of the seat belt pretensioner, energy absorption device and locking mechanism is preferably controlled and/or regulated by the control and/or regulator unit. For example, the seat belt pretensioner encompasses an electric motor, which imparts a rotational motion to the receiving part to retract the seat belt. In an additional variant, the energy absorption device is formed by the seat belt pretensioner, in particular the electric motor, in that the electric motor can be or is actuated in such a way that the seat belt can be secured or is secured with energy absorption with the electric motor.

In an embodiment the at least one seat belt to be a two-point seat belt with a lap belt and/or a three-point seat belt with a lap belt and shoulder belt.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 6:
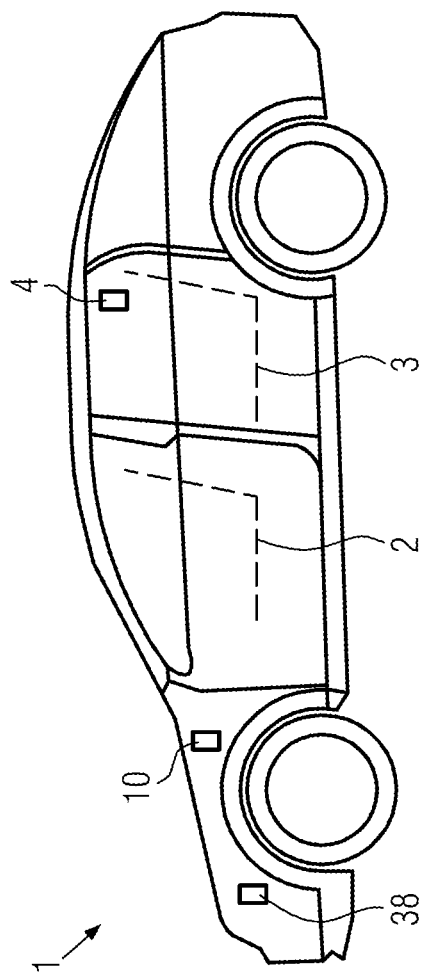
FIG. 6 is a side view of a motor vehicle.

A motor vehicle 1 depicted on FIG. 6 exhibits an electric and/or internal combustion engine (not shown) for driving the motor vehicle. The motor vehicle interior of the motor vehicle 1 accommodates two front seats 2 and three rear seats 3, which are designed as a rear seat bench with three rear seats 3. A seat belt retractor 4 is built or integrated into a C column of the motor vehicle 1 on the two side rear seats 3. The seat belt retractor 4 can be used to retract and extend seat belts 5 for the two side rear seats 3, wherein the seat belts 5 are designed as three-point seat belts 5 with a lap and shoulder belt (not shown).

FIG. 1 to FIG. 4 depicts a first exemplary embodiment of the seat belt retractor 4 for a respective rear seat 3 of the motor vehicle 1. The seat belt retractor 4 encompasses a receiving part 6, which is designed as a roll 7 or spool 8. The receiving part 6 is mounted so that it can turn around a rotational axis 9 by means of a bearing (not shown), so that the receiving part 6 can perform a rotational motion around the rotation axis 9. The seat belt 5 is rolled up and secured on the receiving part 6, so that turning the receiving part 6 in a first rotational direction rolls up the seat belt on the receiving part 6, i.e., rolls it into the seat belt retractor 4, while turning the receiving part 6 in the opposite rotational direction rolls out the seat belt 5, i.e., allows it to extend out of the seat belt retractor 4.

The seat belt retractor 4 is provided with an energy absorption device 12 for securing the seat belt with energy absorption. When the seat belt 5 is secured with energy absorption, the seat belt 5 can be rolled out of the receiving part 6 or pulled out of the seat belt retractor 4 given a high tensile force acting on the seat belt 5. This is necessary to be able to restrain the individual on the rear seat 3 if the motor vehicle 1 gets into an accident on the one hand, and to prevent the very high restraining forces exerted by the seat belt 5 on the individual from injuring the individual on the other.

The energy absorption device 12 exhibits a torsion rod 13, which is rigidly joined with the receiving part 6 at a first location 16, and the torsion rod 13 can be secured at a second location 17 of the torsion rod 13 with a locking device 14 designed as a rod locking device 15. When the torsion rod 13 is secured on or in the area of the second location 17 of the torsion rod 13, and the receiving part 6 is simultaneously turned in a rotational direction to roll off the seat belt 5, the torsion rod 13 is twisted, so that the force acting on the seat belt 5 can be absorbed.

A deceleration sensor 10 is designed as an electronic deceleration sensor 10. A rotational toothed disk 40 with outer teeth 42 is rigidly joined with the torsion rod 13 in the area of the second location 17 of the torsion rod 13. When a limit detected by the deceleration sensor 10 is exceeded, an actuator 39 causes a latching element 41 to engage with the teeth 42 on the rotational toothed disk 40, so that the torsion rod 13 is thereby secured in the area of the second location 17, i.e., a rotational motion by the torsion rod 13 is impeded. In addition, a rotational disk 22 as part 21 is rigidly joined with the torsion rod 13 in the area of the second location 17 of the torsion rod 13. As a result, the rotational disk 22 in conjunction with the rotational toothed disk 40 performs a rotational motion of the receiving part 6 when the seat belt 5 is pulled out of the seat belt retractor 4. On the edge of the rotational disk 22 (FIG. 1 to FIG. 3), a first rotational element 18 is connected with the rotational disk 22 so as to pivot around an element rotational axis 43. On another end region of the first rotational element 18, the latter is joined with a first resilient element 19 designed as a first spring 20. In addition, a first restraining part 23 is immovably arranged in the area of the first rotational element 18, for example by being rigidly secured to the body of the motor vehicle 1. The interior of the first restraining part 23 exhibits an internal toothed ring 24 with teeth 42.

Figure 3:
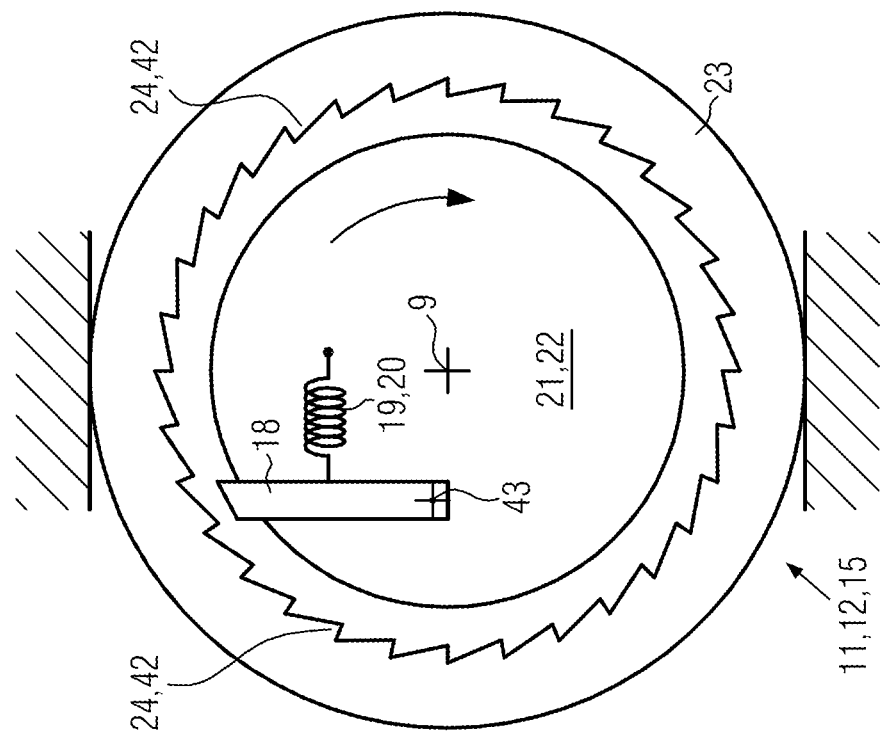
FIG. 3 is a view of a rod locking device of the energy absorption device prior to the activation of the energy absorption device of the seat belt retractor according to FIG. 1.

During a rotational motion by the rotational disk 22, a centripetal acceleration acts on the first rotational element 18, causing the rotational element 18 as shown on FIG. 3 to perform a counterclockwise rotational or pivoting motion around the element rotational axis 43, which is parallel to the rotational axis 9. As a consequence, the upper end of the rotational element 18 on FIG. 3 moves radially outward, and the first spring 20 exerts a restraining force directed opposite this movement on the first rotational element 18.

When a first limit for the angular speed of the rotational disk 22, which as a characteristic variable also represents or characterizes a first extension speed of the seat belt 5, is exceeded, the first rotational element 18 moves in a first direction and engages with the teeth 42 of the internal toothed ring 24, thereby securing the rotational disk 22. However, since the rotational disk 22 is fixedly joined with the torsion rod 13 in the area of the second location 17, the torsion rod 13 is thereby also secured at the second location 17, and as a result can twist to restrain the seat belt 5 with energy absorption, i.e., pulling the seat belt 5 out of the seat belt retractor 4 during exposure to very high tensile forces.

Depending on whether the deceleration limit determined by the deceleration sensor 10 or the first extension speed determined by the rotational element 18 on the rotational disk 22 exceeds a first extension speed limit, the torsion rod 13 is fixed or held in the area of the second location 17. The rotational element 18 in conjunction with the rotational disk 22 thus represents a first mechanical extension speed sensor 11 for the seat belt 5.

The seat belt retractor 4 further exhibits a second extension speed sensor 26, which only determines the extension speed of the seat belt 5 or angular speed of the receiving part 6 with the energy absorption device 12 activated. A mechanism (not shown) is used to mount a rotational part 27 so that it can move in the direction of the rotational axis 9. With the energy absorption device 12 deactivated, the rotational part 27 is not engaged with the receiving part 6, meaning it performs no rotational motion. Only with the energy absorption device 12 activated, meaning at the instant the energy absorption device 12 is activated, is the mechanism (not shown) used to move the rotational part 27 in the direction of the rotational axis 9 toward the receiving part 6 and made to engage with the latter, as a result of which the rotational part 27 also performs the rotational motion of the receiving part 6 with the energy absorption device 12 activated.

In a manner analogous to the first extension speed sensor 11, a second rotational element 28 is joined with the rotational part 27 (FIG. 1, FIG. 2 and FIG. 4) so that it can turn around the element rotational axis 43. A second spring 30 is further arranged on the second rotational element 28 as a second resilient element 29. As a consequence, the rotational part 27 performs the rotational motion of the receiving part 6 only with the energy absorption device 12 activated, thereby causing the second rotational element 28 to perform a motion in a second direction due to the centripetal acceleration acting on the second rotational element, and the second rotational element 28 to engage the teeth 42 of an internal toothed ring 32 on a second restraining part 31 when a second limit for the extension speed of the seat belt 5 is exceeded.

The second restraining part 31 is rigidly joined with the body of the motor vehicle 1 (not shown) analogously to the first restraining part 23. Due to the fixed connection between the rotational part 27 and the receiving part 6 with the energy absorption device 12 activated and after the energy absorption device 12 has been activated, the receiving part 6 is held in place without energy absorption by the second rotational element 28 and the internal toothed ring 32 as the locking mechanism 25. Because the receiving part 6 is secured to the rotational part 27 in this way, the energy absorption device 12 also has no effect, since the seat belt 5 can no longer be rolled off the seat belt retractor 4 under exposure of large tensile forces.

Figure 4:
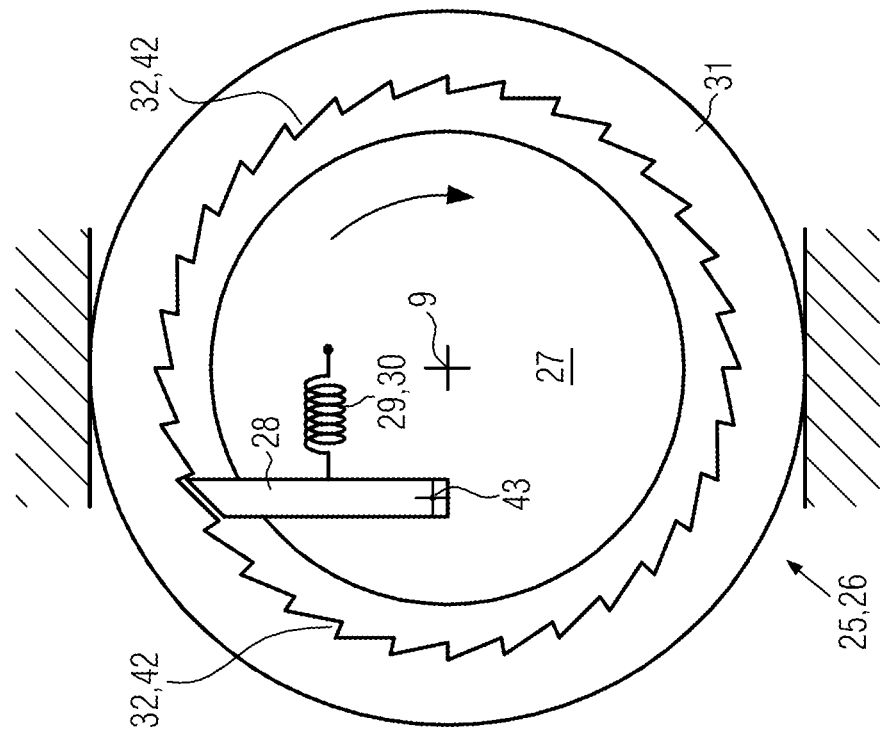
FIG. 4 is a view of the locking mechanism after securing the seat belt without energy absorption, i.e., after the activation of the locking mechanism of the seat belt retractor according to FIG. 1.

FIG. 3 presents a view of the first extension speed sensor 11 or energy absorption device 12 along with the rod locking device 15, while FIG. 4 presents a view of the locking mechanism 25 and the second extension speed sensor 26. In the longitudinal view of the seat belt retractor 4 depicted on FIG. 1, the energy absorption device 12 is deactivated, meaning the latching element 41 is not engaged with the rotational toothed disk 40, and the first rotational element 18 is not engaged with the teeth 42 on the first restraining part 23, as a result of which there is no engagement between the rotational part 27 and receiving part 6 in the section on FIG. 1.

Figure 1:
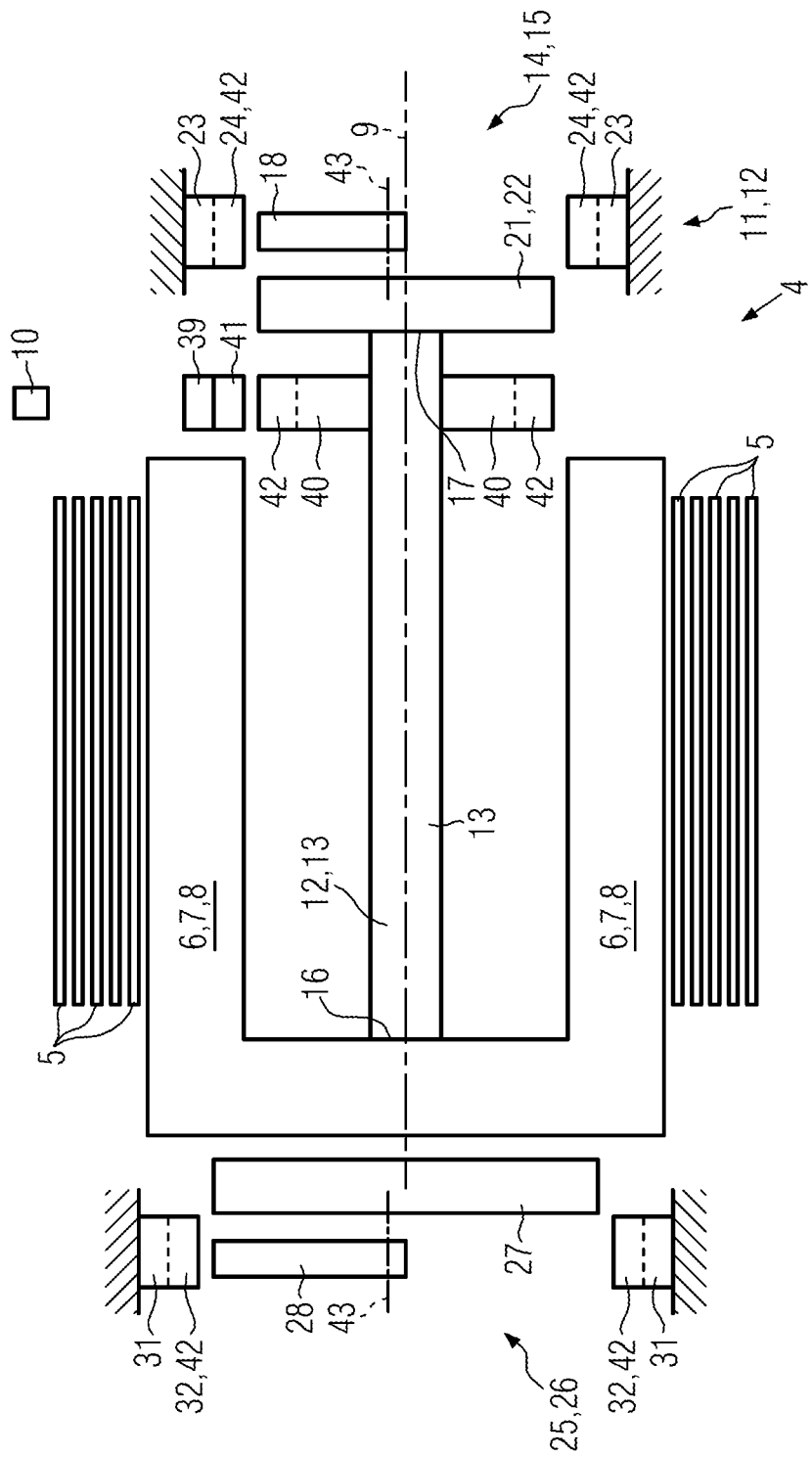
FIG. 1 is a longitudinal section of a seat belt retractor in a first embodiment prior to the activation of an energy absorption device and locking mechanism.
Figure 2:
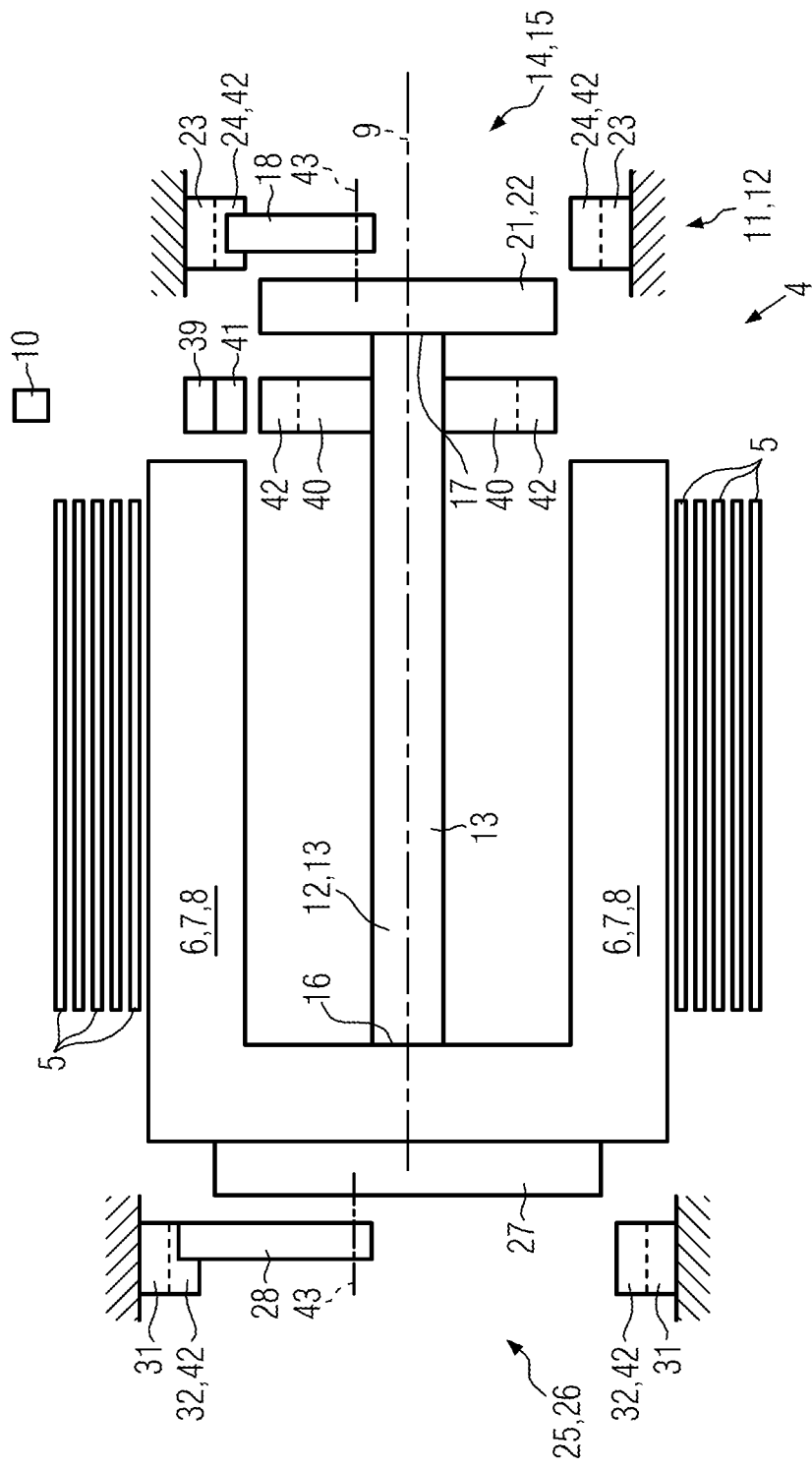
FIG. 2 is a longitudinal section of the seat belt retractor according to FIG. 1 after the activation of the energy absorption device and locking mechanism.

In the longitudinal section shown on FIG. 2, the limit for the deceleration sensor 10 was not yet exceeded, but the first limit for the extension speed of the seat belt 5 acquired by the first extension speed sensor 11 was exceeded, causing the first rotational element 18 to engage with the teeth 42 of the first restraining part 23. Activation of the locking mechanism 25 depends on whether the second limit for the extension speed of the seat belt 5 acquired by the second extension speed sensor 26 is exceeded with the energy absorption device 12 activated. In the longitudinal section of the seat belt retractor 4 depicted on FIG. 2, this second limit for the extension speed of the seat belt 5 was exceeded, thereby causing the second rotational element 28 according to the view on FIG. 2 to engage with the teeth 42 of the second restraining part 31, thereby securing the receiving part 6 without energy absorption.

Only given especially serious accidents, particularly large individuals on the rear seats 3 and/or especially heavy individuals on the rear seats 3 is this second extension speed limit for the seat belt 5 exceeded with the energy absorption device 12 activated, thereby rendering the energy absorption device 12 ineffective. However, this is necessary in especially serious accidents, or given particularly large individuals and/or especially heavy individuals on the rear seats 3, to prevent individuals on the rear seats 3 from coming into contact with the front seats 2 during the accident. In the case of less serious accidents, lighter individuals and/or smaller individuals on the rear seats 3, the second limit for extension speed is not exceeded with the energy absorption device 12 activated, so that the locking mechanism 25 is not activated. Given a less serious accident, just the energy absorption device 12 can be used to restrain the individual on the rear seat 3 adequately enough to prevent contact between the individual on the rear seat 3 and the front seat 2 during the accident.

Figure 5:
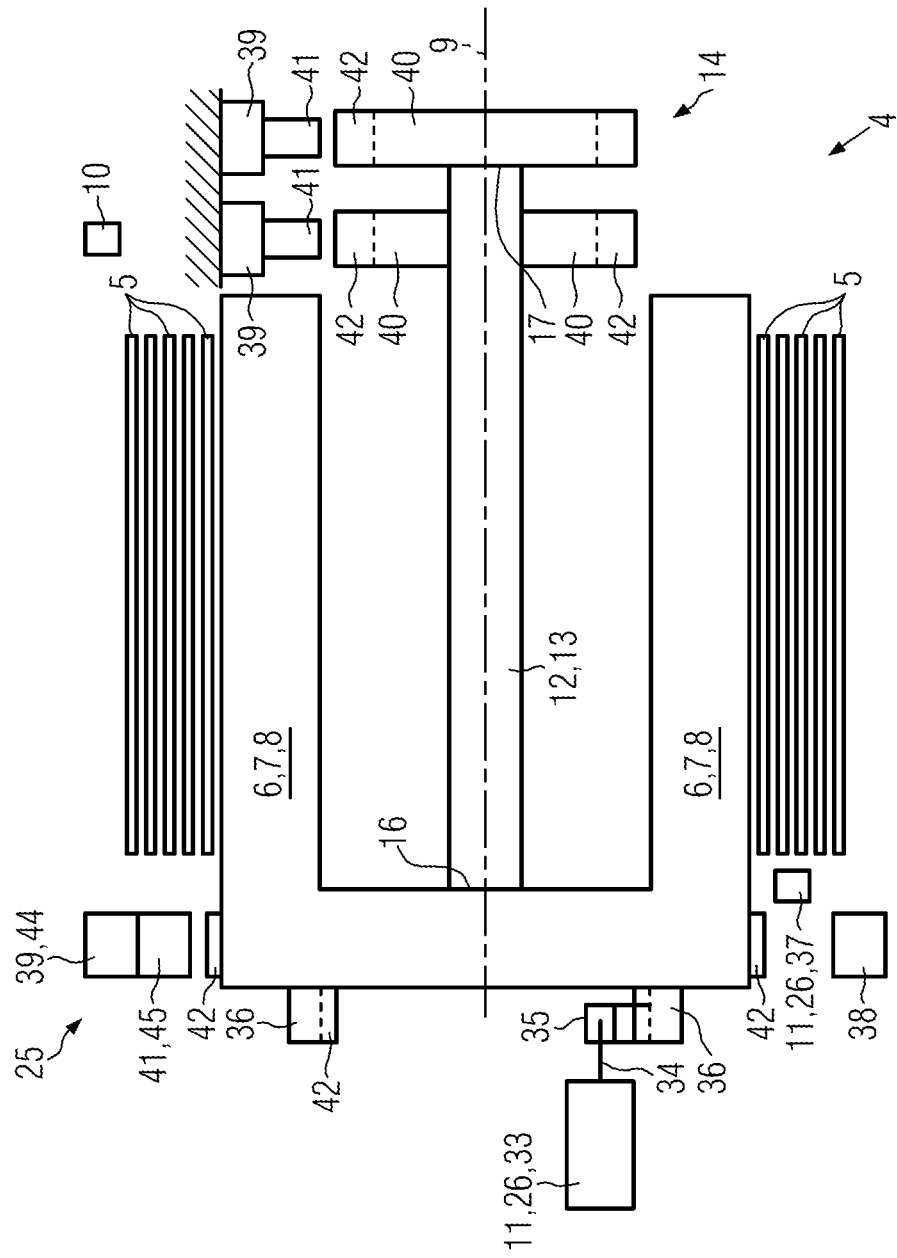
FIG. 5 is a longitudinal section of the seat belt retractor in a second embodiment prior to the activation of the energy absorption device and locking mechanism.

FIG. 5 shows a second embodiment of the seat belt retractor 4. Only the differences from the first embodiment according to FIG. 1 to FIG. 4 will essentially be described below. An optical extension speed sensor 37, which comprises both the first extension speed sensor 11 and the second extension speed sensor 26, i.e., the first and second extension speed sensor 11, 26 constitutes just a single component, continuously detects the extension speed of the seat belt 5 by having the optical extension speed sensor 37 acquire the angular speed of the receiving part 6. These data about the angular speed of the receiving part 6 or extension speed of the seat belt 5 are continuously relayed by way of data and/or control lines (not depicted) to a control and/or regulating unit 38, along with the data for decelerating the motor vehicle 1 acquired by the electronic deceleration sensor 10.

When a limit for the deceleration determined by the deceleration sensor 10 is exceeded or the first limit for the extension speed of the seat belt 5 is exceeded prior to activation of the energy absorption device 12, the control and/or regulating unit causes the latching element 41 to engage with the rotational disk 40 when the deceleration limit is exceeded, or causes the latching element 41 to engage with the rotational toothed disk 40 with the actuator 39 when the first limit for the extension speed is exceeded, thereby securing the torsion rod 13 in the area of the second location 17. The two rotational toothed disks 40 are rigidly joined with the torsion rod 13 in the area of the second location 17. The optical extension speed sensor 37 continuously acquires the extension speed of the seat belt 5 even when the energy absorption device 12 is active, and, when the second limit for the extension speed of the seat belt 5 is exceeded with the energy absorption device 12 active, the control and/or regulating unit 38 moves an additional latching element 45 as a latching element 41 to teeth 42 on the outside of the receiving part 6 by means of an additional actuator 44 as the actuator 39, thereby securing the receiving part 6 without energy absorption, also rendering the energy absorption device 12 ineffective.

If the second limit for extension speed is not exceeded with the energy absorption device 12 activated, the control and/or regulating unit 38 does not activate the additional actuator 44. Instead of the optical extension sensor 37, the first and second extension speed sensor 11, 26 can also be designed as a generator 33 additionally depicted on FIG. 5. The generator 33 exhibits a drive shaft 34, which has secured to it a toothed wheel 35. The teeth of the toothed wheel 35 engage teeth of a toothed ring 36, so that the current produced by the generator 33 has a magnitude that characterizes the angular speed of the receiving part 6, and hence also the extension speed of the seat belt 5. The current produced by the generator 33 is acquired with a current and/or voltage sensor (not depicted), and the relevant data are transmitted to the control and/or regulating unit 38 for purposes of evaluation and controlling the locking mechanism 25 and energy absorption device 12.

The control and/or regulating unit 38 can be used not just for controlling and/or regulating the two seat belt retractors 4 on the two rear seats 3, but also for controlling and/or regulating seat belt retractors 4 (not depicted) on the front seats 2 of the motor vehicle. The latter do not exhibit a locking mechanism 25 and energy absorption device 12. In addition, the control and/or regulating unit 38 can also be used to control and/or regulate the remaining motor vehicle 1.

Viewed as a whole, the seat belt retractor 4 for a seat belt 5 on a rear seat 3 of the motor vehicle 1 is associated with significant advantages. The restraint of individuals on the rear seats 3 can be optimized for accidents of varying severity and/or individuals of varying size and/or individuals of varying weights on the rear seats 3. In the event of a serious accident, the locking mechanism 25 restrains the seat belt to prevent it from being pulled out without energy absorption after the energy absorption device 12 is activated, thus rendering the energy absorption device 12 ineffective, and eliminating any danger that individuals on the rear seats 3 will come into contact with the front seat 2 during the accident.

Given less serious accidents or lighter individuals on the rear seats 3, the second limit for extension speed is not exceeded owing to a corresponding design of the second limit for the extension speed, so that the energy absorption device 12 remains active during the entire accident. The forces exerted by the seat belt 5 on the individual on the rear seat 3 are thus restraining the individual on the rear seat 3.

At least one exemplary embodiment has been described, wherein it must be noted that there are a high number of variants thereto. It must also be remembered that the exemplary embodiment or exemplary embodiments are only examples, and thus not intended to in any way limit the protective scope, applicability or implementability, or the structure. The above description provides the expert with a suitable guide for implementing at least one exemplary embodiment. Let it be understood that various modifications can be made to the function and arrangement of the described components in an exemplary embodiment without deviating from the protective scope of the following claims along with the equivalents of the following claims.

What is claimed is:

1. A seat belt retractor for a motor vehicle, comprising:
a receiving part for a seat belt;
a seat belt that is configured to retract on the receiving part;
a deceleration sensor that is configured to detect a deceleration in the seat belt retractor;
an energy absorption device is configured to fix the seat belt during an accident with energy absorption that is functionally connected with the deceleration sensor so that when a first deceleration limit detected by the deceleration sensor during the accident, the seat belt is restrained with energy absorption, the energy absorption device comprises a torsion rod and a rod locking device, the torsion rod is rigidly joined with the receiving part at a first location, the torsion rod is functionally connected with the rod locking device at a second location and the torsion rod is restrained by the rod locking device in event of the accident if a deceleration limit detected by the deceleration sensor is exceeded;
a first extension speed sensor that is configured to detecting an extension speed of the seat belt prior to activating the energy absorption device;
a locking mechanism that is configured to secure the seat belt without energy absorption;
a second extension speed sensor that is configured to detect the extension speed of the seat belt after activating the energy absorption device, and the locking mechanism is functionally connected with the second extension speed sensor so that when a second extension speed limit of the seat belt is exceeded the locking mechanism restrains the seat belt without energy absorption,
wherein the first extension speed sensor comprises a first rotational element and a first resilient element on the torsion rod or a part joined with the torsion rod, and
wherein the first resilient element is functionally connected with the first rotational element, and a centripetal acceleration stemming from a rotational motion of the torsion rod acts on the rotational element, so that the centripetal acceleration causes the first, correspondingly mounted rotational element to move in a first direction, and the first resilient element applies a force to the rotational element opposite the first direction during the rotational motion of the torsion rod joined with the torsion rod.

2. The seat belt retractor according to claim 1,
wherein the locking mechanism is mechanically functionally connected with the receiving part so that when the second extension speed limit of the seat belt is exceeded the locking mechanism restrains the receiving part, and
wherein the receiving part is a roll.

3. The seat belt retractor according to claim 1,
wherein the locking mechanism comprises an actuator, and
wherein the locking mechanism is activated with the actuator.

4. The seat belt retractor according to claim 1,
wherein the first extension speed sensor detects an angular speed of the receiving part as a characteristic variable of the extension speed of the seat belt.

5. The seat belt retractor according to claim 1,
wherein the receiving part is mounted on a remaining seat belt retractor so that turns around a rotational axis.

6. The seat belt retractor according to claim 1,
wherein a first area of the first rotational element accommodates a first restraining part with an internal toothed ring,
wherein the first rotational element engages the internal toothed ring on the first restraining part at a limit for the movement position in the first direction of the first rotational element so that the torsion rod is secured at the second location, and
wherein a second area of the second rotational element accommodates a second restraining part with the internal toothed ring, and the second rotational element engages the internal toothed ring on the second restraining part at a limit for the movement position in the second direction of the second rotational element, so that the rotational part and the receiving part are secured.

7. The seat belt retractor according to claim 1,
wherein the second extension speed sensor comprises a second rotational element and a second resilient element on a rotational part and the second resilient element is functionally connected with the second rotational element,
wherein a centripetal acceleration stemming from a rotational motion of the rotational part acts on the second rotational element, so that the centripetal acceleration causes the second, correspondingly mounted rotational element to move in a second direction,
wherein the second resilient element applies a force to the second rotational element opposite to the second direction during the rotational motion of the rotational part, and
wherein the rotational part is mechanically functionally connected with the receiving part in such a way that the rotational part is joined with the receiving part only with the energy absorption device activated.

8. A method for operating a seat belt retractor, comprising:
acquiring a deceleration value for a motor vehicle and a first extension speed from a first extension speed sensor associated with the seat belt before an energy absorption device secures the pulling out of the seat belt with energy absorption; and
acquiring a second extension speed from a second extension speed sensor associated with the seat belt retractor after the energy absorption device has secured the pulling out of the seat belt with energy absorption, the second extension speed sensor comprising a rotational element and a resilient element on a rotational part, the resilient element functionally connected with the rotational element, with a centripetal acceleration stemming from a rotational motion of the rotational part acting on the rotational element, so that the centripetal acceleration causes the mounted rotational element to move in a direction, the resilient element applying a force to the rotational element opposite to the direction during the rotational motion of the rotational part and the rotational part is mechanically functionally connected with the receiving part in such a way that the rotational part is joined with the receiving part only with the energy absorption device activated;
locking the seat belt to prevent the seat belt from pulling out with energy absorption if a deceleration value limit and a first limit for the first extension speed of the seat belt out of the seat belt retractor is exceeded; and
locking the seat belt to prevent the seat belt from pulling out without energy absorption while the seat belt is pulled out with energy absorption if the second limit for an extension speed of the seat belt out of the seat belt retractor is exceeded.

9. The method according to claim 8,
wherein the seat belt is first locked so that it cannot be pulled out with energy absorption, after which the seat belt is locked so that it cannot be pulled out without energy absorption.

10. The method according to claim 9,
wherein locking the seat belt comprises locking with a locking mechanism, and
activating the energy absorption device with a rod locking device,
wherein the locking mechanism and locking device are separate components so that the locking mechanism and locking device are spatially separated from each other.

11. A seat belt retractor for a motor vehicle, comprising:
a receiving part for a seat belt;
a seat belt that is configured to retract on the receiving part;
a deceleration sensor that is configured to detect a deceleration in the seat belt retractor;
an energy absorption device is configured to fix the seat belt during an accident with energy absorption that is functionally connected with the deceleration sensor so that when a first deceleration limit detected by the deceleration sensor during the accident, the seat belt is restrained with energy absorption,
a first extension speed sensor that is configured to detecting an extension speed of the seat belt prior to activating the energy absorption device,
a locking mechanism that is configured to secure the seat belt without energy absorption; and
a second extension speed sensor that is configured to detect the extension speed of the seat belt after activating the energy absorption device, and the locking mechanism is functionally connected with the second extension speed sensor so that when a second extension speed limit of the seat belt is exceeded the locking mechanism restrains the seat belt without energy absorption, the second extension speed sensor comprises a rotational element and a resilient element on a rotational part and the resilient element is functionally connected with the rotational element, and a centripetal acceleration stemming from a rotational motion of the rotational part acts on the rotational element, so that the centripetal acceleration causes the mounted rotational element to move in a direction, and the resilient element applies a force to the rotational element opposite to the direction during the rotational motion of the rotational part, and the rotational part is mechanically functionally connected with the receiving part in such a way that the rotational part is joined with the receiving part only with the energy absorption device activated.

12. The seat belt retractor according to claim 1,
wherein the first extension speed sensor is a generator that is mechanically driven by the receiving part,
wherein the seat belt is secured with energy absorption as a function of a current produced by the generator when a first current magnitude limit is exceeded,
wherein the second extension speed sensor is the generator that is mechanically driven by the receiving part, and
wherein the seat belt is secured by the locking mechanism without energy absorption as a function of the current produced by the generator when a second current magnitude limit is exceeded only with the energy absorption device activated.

13. The seat belt retractor according to claim 1,
wherein the first extension speed sensor is an optical speed sensor that is configured to detect an angular speed of the receiving part of the seat belt.

* * * * *